July 24, 1956     I. W. JOHNSON     2,756,358
BUTT WELDED FIELD COILS AND METHOD OF MAKING THE SAME
Filed March 14, 1955     2 Sheets-Sheet 1
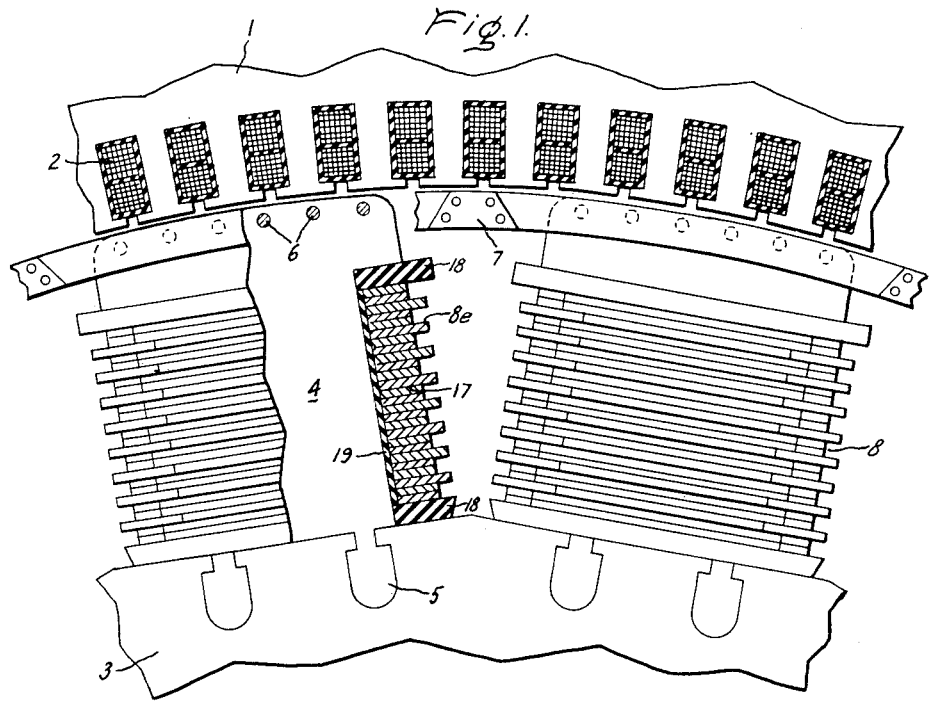
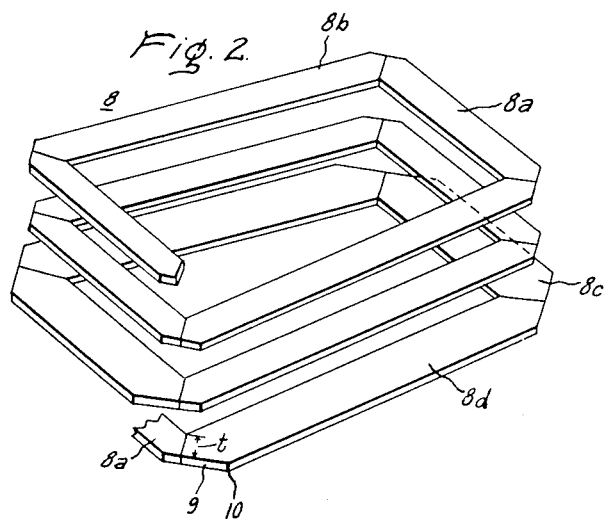
Inventor:
Ivar W. Johnson,
by    *Claude A. Mott.*
His Attorney.

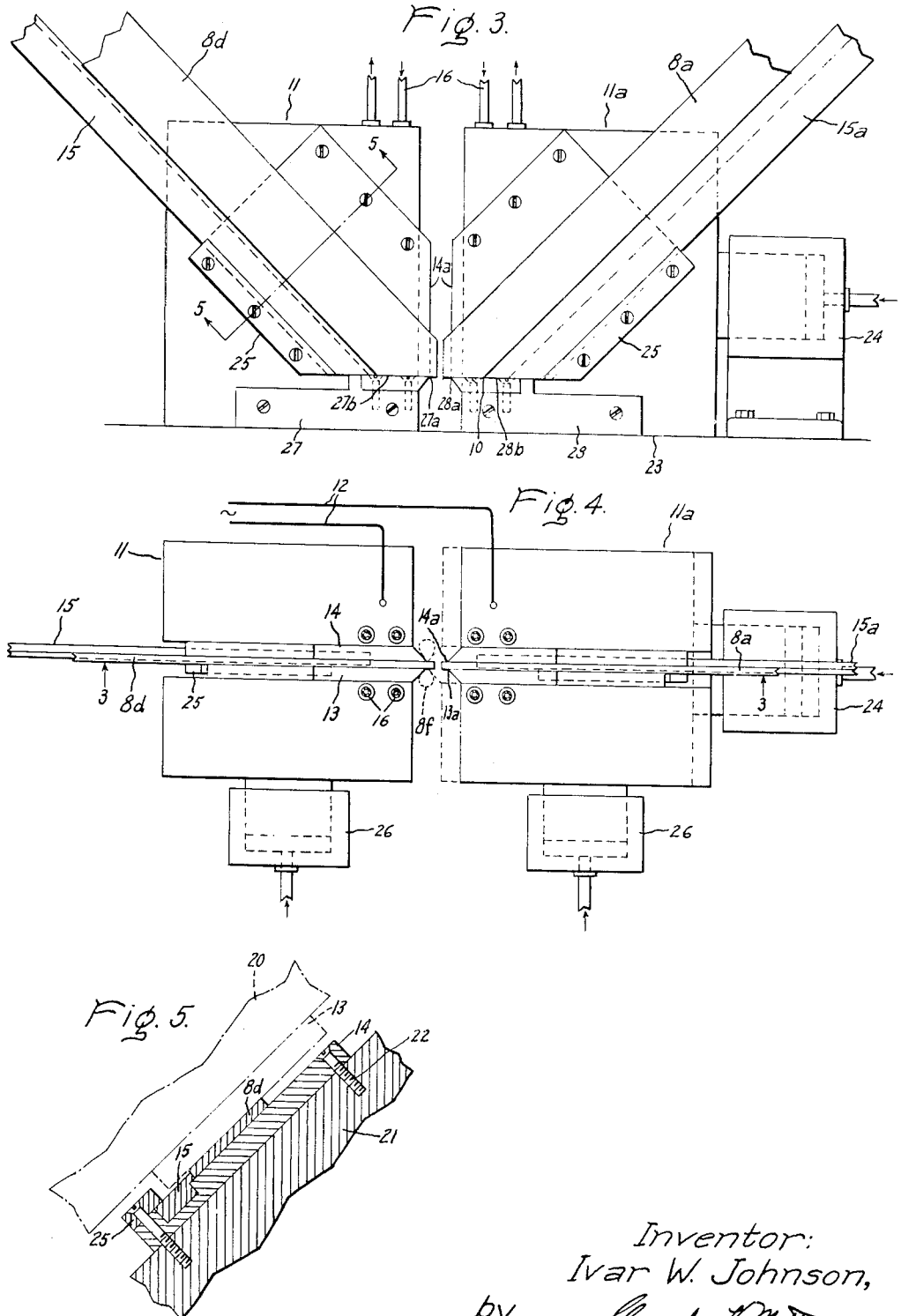

United States Patent Office 2,756,358
Patented July 24, 1956

2,756,358

BUTT WELDED FIELD COILS AND METHOD OF MAKING THE SAME

Ivar W. Johnson, Schenectady, N. Y., assignor to General Electric Company, a corporation of New York Application March 14, 1955, Serial No. 494,092

4 Claims. (Cl. 310—180)

This invention relates to salient pole dynamoelectric machines and more particularly to improved edgewound coils therefor and to the method of making the same.

For approximately the past fifty years the edgewise wound coils for the salient poles of high speed, high capacity synchronous machines have been made by initially winding a soft copper strip edgewise on a winding machine to fit a rectangular pole piece and thereafter annealing the coil to remove the stresses induced by bending and applying pressure axially on the coils to remove the buckling at the corners caused during the bending operation. Winding a conductor in this manner causes the metal to flow to thicken the inner edge of the corners during the bending operation so that each corner must be ground to remove the excess material. Work-hardened copper strip cannot be used in making coils in this manner because extremely high stresses would be set up in the copper due to the low ductility of such strip and the conductor would fracture during bending.

Where such a coil is made from soft copper, braces are needed for supporting the longitudinal sides of the coil to prevent their bowing away from the pole body under the influence of centrifugal force during rotation. Such bracing, since it occupies some of the space between the salient field poles otherwise available for ventilation, reduces the capacity of a machine by decreasing the flow of coolant between the windings. Further, even soft copper strip cannot be formed into a square-ended coil due to the high stresses which would be placed on the copper strip and therefore the cross section of the end plates must be cast with generally curved surface to support the coil against movement longitudinally on the pole body.

Since it is desirable to increase the heat removed from the coil (and therefore to increase the machine's capacity) by providing cooling fins on the coil, certain of the turns of the coil frequently are extended in a longitudinal direction to serve as fins. Such fins increase the cooling surface in contact with the air stream, and by providing channels for guiding the air over the end of the coil, increase the volume of cooling air contacting the coil. Because the copper strip used in edgewound coils necessarily has a uniform width, it is apparent that the bond between the turn which is extended to provide the cooling fin and the adjacent turns of coil is weaker than the bond between the remainder of the coil due to smaller area in contact with the bonding insulation. In addition to making the coil mechanically weaker, less heat can be dissipated from the coil through the magnetic pole body than where the inner edge of each of the turns lie in the same plane and in good heat transfer relationship with the pole body.

It has also been suggested that cooling fins at the ends of the coils could be provided by brazing or otherwise securing thin cooling fins to the end of the coils, but such an arrangement is not very practical because of the difficulty of providing brazed joints which would withstand the large centrifugal forces encountered during the operation of the machine. In addition, the use of two-ply conductors comprising two conductors of equal width connected in parallel with their wider surfaces contacting has been suggested so that a cooling fin may be provided at the end of each turn of the coil by extending one of the plys further than the other. Such an arrangement, however, produces a coil from which less heat will be dissipated through the pole body and also the two plys must be secured together by some means such as brazing to prevent relative movement therebetween.

This invention contemplates the solution of the above problems by providing a square-ended coil fabricated from cold rolled copper strip to provide a coil construction having greatly increased strength bowing away from the pole body under the influence of centrifugal force and increased capacity by providing cooling fins which may, if desired, completely surround the coil.

An object of this invention is to provide a field coil for a high speed, high capacity, salient pole dynamoelectric machine having increased strength for withstanding centrifugal force and increased capacity.

Another object of this invention is to provide a square-ended field coil construction for a large salient pole synchronous dynamoelectric machine in which cooling fins may be provided completely around the pole piece while maintaining the inner peripheral surface of each of the turns substantially in contact with the pole piece.

Another object of this invention is to provide a method for making a field coil for a large salient pole, high capacity dynamoelectric machine wherein a plurality of short lengths of cold-worked silver-bearing copper strip are butt welded to form a square-ended coil.

A further object of this invention is to provide a method of butt welding a plurality of short lengths of conductor to form a square-ended field coil for a high capacity salient pole dynamoelectric machine which requires no preliminary weld preparation.

Further objects and advantages of this invention will become apparent and this invention will be better understood by reference to the accompanying drawing and description, and the features of novelty which characterize this invention will be pointed out with particularity in the claims annexed to and forming part of this specification.

In the drawing:

Fig. 1 is a fragmentary plan view of a large synchronous generator embodying this invention.

Fig. 2 is an exploded perspective view of a portion of a field coil for the generator of Fig. 1.

Fig. 3 is a diagrammatic fragmentary elevational view, along line 3—3 of Fig. 4, of welding dies clamping two lengths of copper strip prior to welding them in accordance with this invention.

Fig. 4 is a top view of Fig. 3.

Fig. 5 is a cross-sectional view along line 5—5 of Fig. 3.

In accordance with one aspect of this invention, two short straight lengths of conductor strip for forming the adjoining transverse and longitudinal portions, respectively, of a turn of a field coil have ends which are preferably mitred, or biased, at approximately 45° with respect to their longitudinal sides. One end of each of these lengths is clamped in one of a pair of aligned welding dies which are then slowly moved together to flash the biased edges to heat the ends of the conductor lengths immediately adjacent the biased edges and to eliminate the impurities therein. Thereafter the dies are suddenly moved together to butt weld the two lengths of conductor together under high current and forging pressure conditions. The current is then turned off and the material immediately adjacent the butt weld is work-hardened substantially to its original strength by continuing the forging pressure until the welding dies meet. As the welding dies come together, any metal which is upset during the butt welding or cold working steps is extruded laterally between the dies and cut off to trim the weld junction to the thickness of the conductor strip. The welding dies are preferably water cooled to aid in preventing the annealing of the remainder of the conductor remote from the butt welded joint. By selectively welding a plurality of rectangular conductor strips of different widths and lengths, a square-ended coil having cooling fins is fabricated.

In the drawing, the invention, as shown in Fig. 1, is embodied in the field winding of a large synchronous generator having a stator member 1 with a suitable stator winding 2 placed in peripheral slots of the stator in the usual manner. The generator also has a rotor or field member which includes a rotor spider 3 on which a plurality of salient pole pieces having rectangular-sectioned pole bodies 4 are mounted in any suitable manner, as by dovetail joints 5. The pole pieces may be provided by a damper winding of any suitable type which may consist of longitudinal damper bars 6 placed in slots in the pole pieces and connected at their ends by conductors 7. Each pole body 4 is surrounded by square-ended field coils 8. Each of the field coils 8, as shown more clearly in Fig. 2, consists of a plurality of turns of edgewise wound strips to form a multiturn coil.

In accordance with the present invention, each coil is wound from a plurality of short strips of pre-cut work-hardened copper strip of varying widths and lengths, such as full-hard, silver bearing copper strip identified in the trade by ASTM B–152 Type D–1 or full-hard, tough-pitch copper strip ASTM B–152 ETP. As shown in Fig. 2, pre-cut lengths of strip 8a, 8b, 8c and 8d are joined at their ends by butt-welding, as hereinafter more fully described, to form a plurality of turns for the coil. It will be noted that the strip forming lengths 8a and 8b are of equal width (i. e., have an equal dimension in the direction normal to the axis of pole piece 4) and that the strip forming lengths 8c and 8d are somewhat wider. The multiturn coil, thus formed with wider turns selectively positioned throughout the coil, provides cooling fins, such as 8e of Fig. 1, which completely surround the coil. It will be observed that the inner edge of the turn forming the fin 8e is aligned with the inner edge of the narrower turns of coil 8 to provide a uniformly strong mechanical bond between all turns of the coil.

In order to more fully understand the square-ended finned coil construction, reference is made to Figs. 3, 4 relating to its manufacture and showing the welding machine diagrammatically.

A pair of welding dies 11 and 11a are provided as shown in Fig. 3. A suitable source of A. C. potential 12 is provided to produce the welding current for the resistance welding of the joints and may be controlled in any suitable manner. The welding dies 11 and 11a are, as best shown in Fig. 4, aligned to produce a butt welded joint between the strips such as 8a and 8d so that the strips will lie edgewise in the same plane upon the completion of the weld. The welding dies 11 and 11a each comprise a forward and a back die 13 and 14, respectively, each of which is secured to a backing fixture 20 and 21, respectively, in any suitable manner and are shown as being secured by bolts 22. Welding dies 11 and 11a are mounted on a platform 23 so as to be movable toward each other by any means such as a hydraulic actuator 24. Additional bottom dies 27 and 28 are respectively secured to the backing fixtures 21 of dies 11 and 11a. It will be noted in Figs. 3 and 4 that the forward and back dies 13 and 14 as well as the bottom dies 27 and 28 are provided with knife edges 13a, 14a, 27a and 28a, respectively, which are aligned. Bottom dies 27 and 28 project forward from the backing fixtures 21 of dies 11 and 11a, respectively, so that surfaces 27b and 28b provide a shell upon which the copper strips rest during the welding operation as hereinafter more fully described.

The end of each pre-cut length of strip 8a, 8b, 8c and 8d, inclusive, are cut on a bias of approximately 45°. In order to provide a means for accurately locating the strips which form the transverse and longitudinal sides of the coil in the welding dies 11 and 11a and to insure that the turns of the coil will uniformly have inner dimensions substantially equal to the dimension of the pole body 4, the ends of the transverse and longitudinal strips are additionally cut at a bias, as indicated at 9, to provide a corner 10 (see Fig. 2) on the outer edge of strip. Corner 10 provides a reference point for the positive and accurate alignment of the strips in the welding dies 11 and 11a so that with proper allowance for the distance between the knife edges 14a of the dies 11 and 11a, each transverse and longitudinal portion of a turn will be identical in length respectively after welding. The length $t$ of the weld, as indicated in Fig. 2, preferably has a cross-sectional area at least equal to that of the narrowest bar 8a to be used in the coil. This will insure that the electrical resistance is not increased by the joint between adjacent sides of the coil and also will insure that proper strength is provided in the coil at the butt welded joint.

In order to butt weld conductor strips of different widths (e. g., 8a and 8d) together and still retain the same internal dimensions of the coil, a plurality of removable wedges 15 and 15a are provided. As shown in Fig. 5, wedges 15 and 15a are positioned in slots in back die 14 and are secured therein by member 25. The wedges 15 and 15a are dimensioned so that they extend above the clamping surface of the back die 14 the distance less than the width of the copper strip to be welded to insure that the strip will be securely clamped between dies 13 and 14.

The pre-cut lengths of strip are selectively placed in the welding dies 11 and 11a, as shown in Fig. 3, with their biased outer end resting on surfaces 27b and 28b and their corners 10 positioned in the corresponding corner recess provided in welding dies 11 and 11a. The forward dies 13, which may be hinged with respect to back dies 14, respectively, are brought into engagement as by hydraulic actuators 26 to immovably clamp the strips being welded in position with the strips extending toward each other beyond the ends of the knife edges 14a an equal amount which depends upon the copper strip being welded. The free end of each strip should be approximately 3 to 6 times the thickness of the strip. The welding dies 11 and 11a are then moved slowly together with full voltage applied therebetween, and as the high spots on the ends of the two copper strips come into contact with each other, the resulting extremely high current density causes these spots to immediately melt and expel, or flash, the metal therefrom. This heats the metal in the immediate vicinity of the ends of the strips and dispels the oxides and impurities from the metal to eliminate the need for flux or other weld preparation. The rapidity with which this heating takes place concentrates the heat in the metal between the dies 11 and 11a.

Upon the completion of the flashing operation, a pressure of approximately 20,000 lbs. p. s. i. is suddenly applied between the welding dies 11 and 11a with full voltage continued to be applied to produce a current density of about 60,000 amps. p. s. i. This causes the sudden fusion of the two strips of metal at a non-interlocking joint under forging pressure. After a predetermined period of time, say 2–10 cycles depending on the cross section of the strip being welded with increased time for increased cross section, the current is cut off and the forging pressure is continued to work-harden the material at and adjacent the joint until the knife edges 13a, 14a, 27a and 28a of the dies meet. During the work-hardening process the dies 13 and 14 extrude and cut off the surplus metal 8f from the sides of the joint, as shown in the dotted position of Fig. 4. In addition, bottom dies cut off surplus metal at the bottom of the joint. This eliminates substantially all the grinding which would otherwise be necessary to reduce the thickness of the material at the joint to the original thickness of the strip. Also, bringing the dies together, in conjunction with the initial location of corner 10 in the dies insures that all the turns of the coil will have the uniform length and width.

As will be observed from the drawings, the welding dies 11 and 11a preferably have coolant passages therein connected to a source of supply (not shown) by pipes 16 to prevent the welding heat from changing the hardness of the strip except immediately adjacent the welded joint. The work-hardening of the material adjacent the weld joint after the joint is formed and the rapidity of the welding operation result in a joint 95% as hard as the hardness of the copper strip prior to the welding operation. Thus, it can be seen that this invention provides for a welded coil joint of high strength, and by increasing the width $t$ slightly, the weld may be of equal or greater strength than that of the copper strip from which it was formed.

After the coil has been formed in this manner, it may be insulated in the usual way by placing layers of insulating material 17, such as mica, between the turns of the coil and the coil may be insulated from the magnetic pole body 4 in any usual manner as by placing insulating washers 18 at the top and the bottom thereof and by providing a layer of insulation 19 between the coil in the pole body 4.

Because this method of welding may be used for tough pitch or silver-bearing cold-worked copper strips of different widths, it can be readily seen that a square-ended coil of high strength may be provided with cooling fins by selectively welding together such strips of different widths. If desired, one coil turn may be made of strip of one width and the second coil turn may be made of strip having a greater width. Alternatively, cooling fins may also be provided at the ends only or at any other location as desired.

Tests have indicated that machines having coils made in accordance with this invention and having fins completely surrounding the coil are more than 20° C. cooler under equal operating conditions and are therefore capable of a greater output than an edgewise wound coil having fins and made from a single soft copper strip.

In addition to the improved performance due to better cooling, the bonding between adjacent layers is greater since the bonding secures adjacent turns over the entire area of the coil of lesser width.

Moreover, because this invention permits the use of square-ended coils, the end plates for supporting the coil and the pole tips for supporting the coil ends may be of a simple rectangular cross section instead of the curved constructions which have previously been required.

Additionally, because cold-worked silver-bearing copper strips, such as ASTM B152 Type D-1, may be used, the coil bracing which initially has been required to support the longitudinal sides of the coils against the pole against the influence of centrifugal force may be eliminated or greatly reduced in strength. This will allow a higher speed of rotation of the rotor or, alternatively, the use of a longer coil. And further, by utilizing the above-described method of making a coil, aluminum to copper welds may be made where it is desired to make a portion of the coil of aluminum and another of copper, or alternatively, coils may be made completely of aluminum.

While there is illustrated and described particular embodiments of this invention, further modifications and improvements thereof will occur to those skilled in the art. It is to be understood, therefore, that this invention is not limited to the particular forms shown, and it is intended in the appended claims to cover all modifications which do not depart from the spirit and scope of this invention.

What is claimed as new and desired to be secured by Letters Patent of the United States is:

1. A field coil for use in a dynamoelectric machine having a field structure with a plurality of pole pieces comprising a plurality of turns arranged to be wound edgewise on each of said pole pieces, each of said turns comprising a plurality of unbent conductor strips forming the longitudinal and transverse portions thereof, said longitudinal and transverse strips being sequentially butt welded together at their ends to form a joint therebetween, certain of said strips being formed of full-hard cold-worked copper and certain of said strips being wider than remaining strips to provide cooling fins for said coil, said joint being work-hardened after welding to increase the strength of the joint to the strength of the respective strips prior to welding.

2. The method of forming an edgewound coil having a plurality of turns each of which are of rectangular form comprising precutting transverse and longitudinal legs for said coil from full-hard copper bar stock, selectively butt welding the ends of the legs together to form a joint therebetween and thereafter work-hardening the joint to strengthen the copper therein to substantially the initial hardness of the stock.

3. The method of forming an edgewound coil having a plurality of turns each of substantially rectangular form, which comprises pre-cutting a plurality of lengths of strip from full-hard tough pitch copper stock for the transverse and longitudinal portions of the turns, clamping adjacent ends of a longitudinal and a transverse strip in axial alignment with each other, applying an electric potential between said clamped ends, slowly moving the ends together to heat the same and to remove the impurities therefrom, thereafter suddenly increasing the pressure and current to fuse the metal and form a butt welded joint therebetween, and then work-hardening the joint to increase its hardness substantially to the hardness of the original stock.

4. The method of forming an edgewound coil which comprises pre-cutting a plurality of lengths of strip from metal stock of a size to provide the transverse and longitudinal portions of the turns, aligning the transverse and longitudinal portions in a position to substantially form a right angle with each other, applying an electric potential between adjacent ends of said portions and slowly moving the ends together until they fuse and form a weld joint therebetween, and thereafter work-hardening the joint to increase its hardness substantially to the hardness of the original stock.

References Cited in the file of this patent

FOREIGN PATENTS 749,772    France _____ May 15, 1933